No. 622,779. Patented Apr. 11, 1899.
C. E. NORTON.
EYEGLASSES.
(Application filed Jan. 30, 1897.)

(No Model.)

WITNESSES:
Alice Robinson.
Ella Robinson

INVENTOR
Charles E. Norton
BY
Almon Robinson
ATTORNEY.

UNITED STATES PATENT OFFICE.

CHARLES E. NORTON, OF LEWISTON, MAINE.

EYEGLASSES.

SPECIFICATION forming part of Letters Patent No. 622,779, dated April 11, 1899.

Application filed January 30, 1897. Serial No. 621,350. (No model.)

*To all whom it may concern:*

Be it known that I, CHARLES E. NORTON, a citizen of the United States, residing at Lewiston, in the county of Androscoggin and State of Maine, have invented a new and useful Improvement in Eyeglasses, of which the following is a specification.

When eyeglasses or spectacles are correctly fitted and in proper position for use, the lenses are held at a certain definite distance from the eyes and each lens has its optical axis in line with that of the eye behind it when used for the purpose for which it was intended. As there is in the eyeglasses in common use nothing to insure their being either placed or kept in any definite position, oculists have been disposed to discourage their use and to prescribe spectacles instead. One of the principal advantages which spectacles have over eyeglasses in this respect is that they have a bridge, for though spectacle-bridges differ greatly in form they all tend to hold the lenses at a definite distance from each other and from the nose.

The principle of construction of most eyeglasses makes the use of a bridge impossible, and the few that have been made with a bridge can be used in only a limited number of cases, for the reason that a part of the space usually occupied by the bridge is taken up by the clamping mechanism, and with most eyes all the space between the lenses is needed for a suitable bridge.

The principal object of my invention is to provide a construction which will permit the use of a bridge identical in all respects with those used in spectacles, and wherever the word "bridge" is hereinafter used a spectacle-bridge unchanged in form or function is understood.

My invention consists, primarily, in attaching a standard to the inner edge of each lens, which projects upward and has the clamping mechanism attached to its upper end.

My invention further comprises various details hereinafter more fully set forth.

Figure 1:
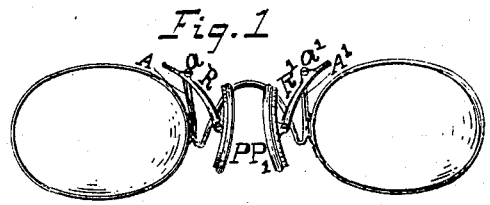
Figure 2:
Figure 3:
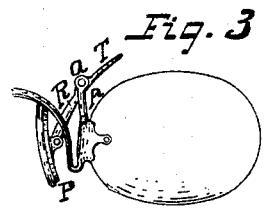
Figure 4:
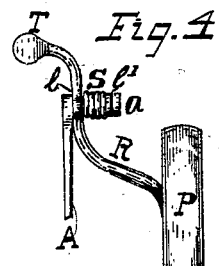
Figure 5:
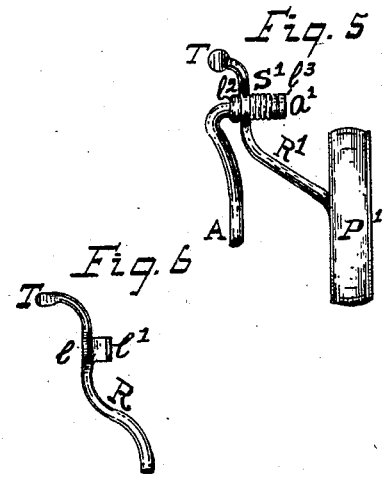
Figure 6:

In the accompanying drawings, Figure 1 is a front elevation. Fig. 2 is an end view. Fig. 3 shows half of a frameless eyeglass. Fig. 4 is an enlarged view of the standard and connections. Fig. 5 is an alternative construction of the standard. Fig. 6 is a detail.

In the figures, A A' are standards, which should be, like the bridge, of such a stiffness and temper that they can be readily bent by pliers, but will at the same time keep their shape in use.

R R' are swinging arms, to which the pressure-pads P P' are attached; $a$ $a'$, studs projecting from the top of the standards, except in Fig. 5, where they are shown as formed from the standard itself; T T', thumb-pieces projecting from the swinging arms R R'.

$l$ $l'$ $l^2$ $l^3$ are lips turned up from the edges of the swinging arms R R' to form the bearings on which they swing; S S', spiral springs, which have one end attached to the standards A A' and one to the arms R R' and act to press the pads P P' toward the nose.

When I wish to use my invention, I first adjust the lenses in their proper position and fit the bridge to the nose of the wearer. I then take the thumb-pieces T T' between the thumb and forefinger and press them toward each other and then place the bridge in its proper place on the nose and release T T'. The springs S S' will then swing the pads P P' against the nose with sufficient pressure to hold the eyeglasses in place. If necessary, the relative position of the pads and frame can be changed by bending the standards A A'.

I am aware that eyeglasses have been heretofore constructed in which the lenses have been connected by a rigid bar that bore a greater or less resemblance to a spectacle-bridge and had swinging arms carrying pressure-pads attached to it in different ways. I do not claim any construction in which the pressure-pads are attached to a bridge-piece between its points of attachment to the lenses.

What I claim, and desire to secure by Letters Patent, is—

1. The combination with a pair of lenses connected by a spectacle-bridge of a pair of upwardly-projecting standards attached to the inner edges of the lenses, and a pair of spring-actuated nose-clamps mounted upon the upper ends of the standards.

2. In a pair of eyeglasses, the combination with the lenses, of a bridge-piece adapted to rest upon the wearer's nose and bent at each end beyond its points of attachment to the lens to form standards, and spring-actuated clamping devices, pivoted to the upper ends of the standards, so as to move in planes approximately parallel with the lenses, substantially as set forth.

In testimony whereof I have hereunto set my hand, in the presence of these witnesses, this 27th day of January, 1897.

CHARLES E. NORTON.

Witnesses:
ALMON ROBINSON,
EMILY G. PAYNE.